Nov. 5, 1963
E. A. KOLENKO
3,109,290
HIGH-VACUUM TRAP FOR DIFFUSION PUMPS
Filed June 27, 1961
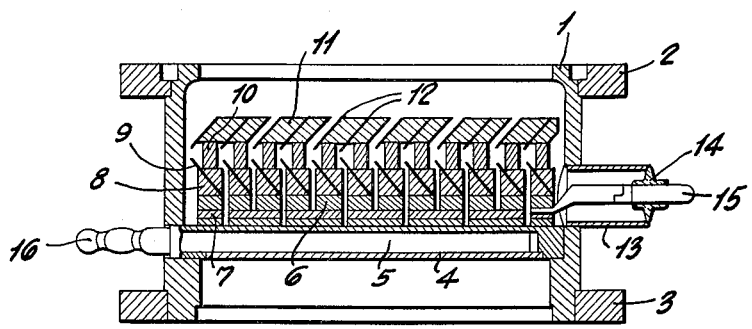
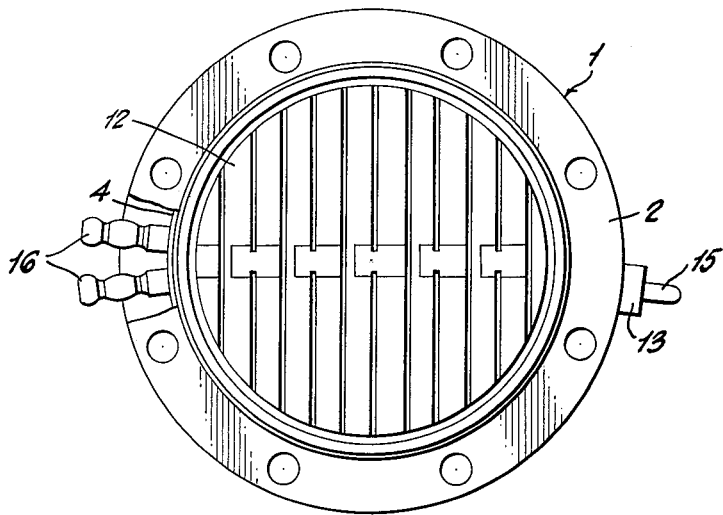
INVENTOR
EVGENY A. KOLENKO United States Patent Office 3,109,290
Patented Nov. 5, 1963

3,109,290
HIGH-VACUUM TRAP FOR DIFFUSION PUMPS
Evgeny Andreevich Kolenko, Academica Pavlova 14,
Apt. 26, Leningrad, U.S.S.R.
Filed June 27, 1961, Ser. No. 121,293
1 Claim. (Cl. 62—3)

The present invention relates to a high vacuum trap for diffusion pumps.

The present invention relates particularly to the improvement in design of high vacuum freezing traps for diffusion vacuum pumps and specifically to high vacuum freezing traps provided with thermoelectric cooling.

Modern evacuating installations with diffusion vacuum pumps are capable of producing a vacuum in the space to be evacuated equal to the vapor pressure of the working liquid (oil) employed in the pumps.

For obtaining a higher vacuum, freezing traps are used in which additional condensation of the vapours of the working liquid takes place.

In such freezing traps continuously flowing water is used as a cooling medium, thus providing an increase in the vacuum limit up to $1.10^{-6}$ mm. mercury column.

When a still higher vacuum is desired, the freezing traps are cooled with liquid nitrogen or with solid carbon dioxide.

However, employment of these latter coolants introduces a number of disadvantages, the more important of which are: scarceness of the coolants, high consumption danger of explosion when used in glass vacuum systems, difficulty of using traps, cooled with such mediums, use in automatically and remote-controlled evacuating installations, etc.

Attempts have been made to use thermoelectric batteries for cooling of the freezing vacuum traps.

However, no temperature below $-25$ to $-30°$ C. can be attained in any of the existing freezing traps with thermoelectric cooling devices which is insufficient for a complete freezing out of the vapours of the diffusion pump working liquid.

The chief purpose of the present invention is to overcome this shortcoming of the existing freezing traps with thermoelectric cooling and to design such a trap, which will provide temperatures down to $-50$ to $-55°$ C., i.e., to a temperature sufficient for a complete freezing out of the vapours of the pump working liquid (oil).

Another purpose of the invention is to reduce the parasitic heat drops in the heat extraction system removing heat from the hot junctions of the trap thermoelectric battery.

Still another purpose of the invention is to increase the efficiency of utilization of the cooling thermoelectric battery.

A further purpose of the invention is to obtain such a disposition of condensing planes for condensation of the working liquid vapours in the trap that will prevent the penetration of the working liquid vapours into the vacuum area, and cause decrease of evacuating resistance.

Further objects and advantages of the invention will be apparent from the following description taken in conjunction with the accompanying drawing wherein:

FIG. 1 is a longitudinal sectional view showing a high vacuum trap constructed in accordance with this invention; and FIG. 2 a top plan view of the trap shown in FIG. 1 and with parts broken away for greater clarity.

Generally stated this invention contemplates a high vacuum trap, including a cooling battery composed of several cascades, the cold junctions of each cascade having their own collectors, while the hot junctions of each following cascade are located on the collectors of the cold junctions of the previous cascade.

With continued reference to the drawing the trap consists of body 1, fitted with flanges 2, 3 for connecting the trap to the pump and to the object to be evacuated. Into the body 1 a metal (e.g. copper) liner 4 is inserted (for example by means of soldering), having a duct 5 for the passage of water, which is used to remove heat from the hot junctions of the thermoelectric battery located inside the trap.

With the aim of reducing the trap temperature to the prescribed value, the thermoelectric battery of the trap is composed of several, for example, two cascades (as shown on the drawing).

The first cascade 6 of the thermoelectric battery is connected (e.g. by means of soldering) by its hot junctions through the electroinsulating transition pads 7, having a low heat resistance (a layer of aluminium oxide), to liner 4, serving for heat removal.

The cold junction collectors 8 of the first cascade of the thermoelectric battery are provided with cooled fins 9 where the condensation of the pump working liquid vapours takes place. These fins disposed at an angle of 45° with respect to the vertical axis of the trap, are formed by plates made of material with a high heat conductivity, for example, of copper.

The thermoelectric battery hot junctions of the second cascade 10 are fitted (for example, by soldering) on collectors 8 of the cold junctions of the first cascade 6 thermoelements. The cold junctions collectors 11 of the second cascade 10 of the thermoelectric battery are also provided with fins 12 for condensating the pump working liquid vapours. The fins 12 are situated at an angle of 90° with respect to the fins 9 of the thermoelectric battery first cascade 6. Such a disposition of condensing fins ensures a minimum evacuating resistance.

The thermoelectric battery is supplied with current by means of a vacuum-tight lead-in formed by cylinder 13, into which a current-carrying electrode 15 is soldered through glass element 14. The second pole of the circuit is connected to the trap body.

The water removing heat from the hot junctions of the thermoelectric battery, is supplied through fittings 16.

It will be obvious to those skilled in the art that various changes may be made in the invention without departing from the spirit and scope thereof and therefore the invention is not limited by that which is shown in the drawing and described in the specification, but only as indicated in the appended claim.

What is claimed is:

A high-vacuum cold trap for diffusion pumps, said trap comprising a hollow elongated body, means on one end of said body for connecting the same to a vacuum pump and means on the opposite end of said body for connecting the same to a space to be evacuated, a liner in said body having a passage for the flow of a cooling medium, a thermoelectric battery disposed in said body, said battery including a plurality of cascades having collectors for the cold junctions of each cascade, the hot junctions of the first cascade being cooled by said cooling medium, the hot junctions of the following cascades being in heat conducting relationship with the collectors of the previous cascades to cool the hot junctions of the following cascades, vapor condensing fins on the collectors of each cascade, the fins on the collectors of the first cascade being disposed at an angle of forty-five degrees with respect to the axis of said body and the fins on the collectors of the following cascades being disposed at an angle of ninety degrees with respect to the fins of the next previous cascade.

References Cited in the file of this patent
UNITED STATES PATENTS

| | | |
|---|---|---|
| 2,565,722 | Dawley | Aug. 28, 1951 |
| 2,844,638 | Lindenblad | July 22, 1958 |
| 3,010,285 | Penn | Nov. 28, 1961 |